United States Patent
Ullah et al.

(10) Patent No.: US 7,699,114 B2
(45) Date of Patent: Apr. 20, 2010

(54) ELECTRO-OPTIC CABLEHEAD AND METHODS FOR OILWELL APPLICATIONS

(75) Inventors: Kalim Ullah, Houston, TX (US);
Montie W. Morrison, Sugar Land, TX (US); Daniel Hogan, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 555 days.

(21) Appl. No.: 11/468,607

(22) Filed: Aug. 30, 2006

(65) Prior Publication Data

US 2008/0053654 A1 Mar. 6, 2008

(51) Int. Cl.
*E21B 47/01* (2006.01)
(52) U.S. Cl. .......................... 166/385; 166/66; 385/101
(58) Field of Classification Search ................. 166/66.5, 166/66; 385/100, 101, 102, 103, 104, 105, 385/106, 138; 367/25, 81, 69; 439/190, 439/191, 192, 193, 194, 195
See application file for complete search history.

(56) References Cited

U.S. PATENT DOCUMENTS

| 3,066,969 | A | | 12/1962 | Camac |
| 4,744,626 | A | | 5/1988 | Mery |
| 4,938,060 | A | | 7/1990 | Sizer |
| 4,941,349 | A | | 7/1990 | Walkow et al. |
| 5,140,319 | A | | 8/1992 | Riordan |
| 5,485,745 | A | | 1/1996 | Rademaker |
| 6,484,801 | B2 | * | 11/2002 | Brewer et al. .............. 166/65.1 |
| 2004/0134667 | A1 | * | 7/2004 | Brewer et al. ............... 166/380 |

* cited by examiner

*Primary Examiner*—David J Bagnell
*Assistant Examiner*—Robert E Fuller
(74) *Attorney, Agent, or Firm*—Michael L. Flynn; David Hofman; Jody Lynn DeStefanis

(57) ABSTRACT

An oil and gas well assembly is provided that includes a wireline cable having at least one optical fiber; a downhole tool having at least one optical fiber; and a cablehead having a first end connected to the wireline cable, a second end connected to the downhole tool. The cablehead further includes at least one optical fiber which transmits data between the at least one downhole tool optical fiber and the at least one wireline cable optical fiber.

25 Claims, 7 Drawing Sheets

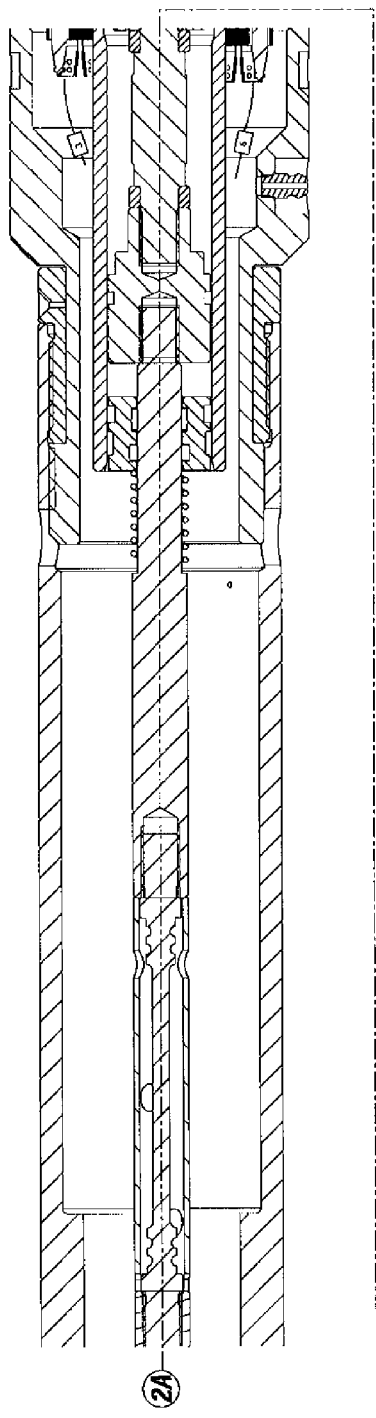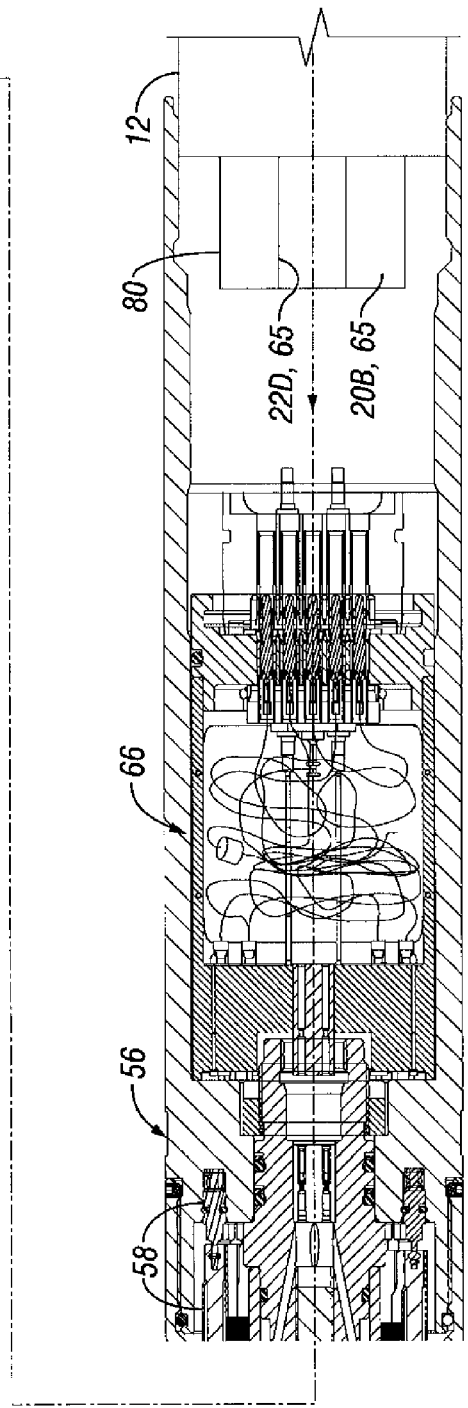
FIG. 2B

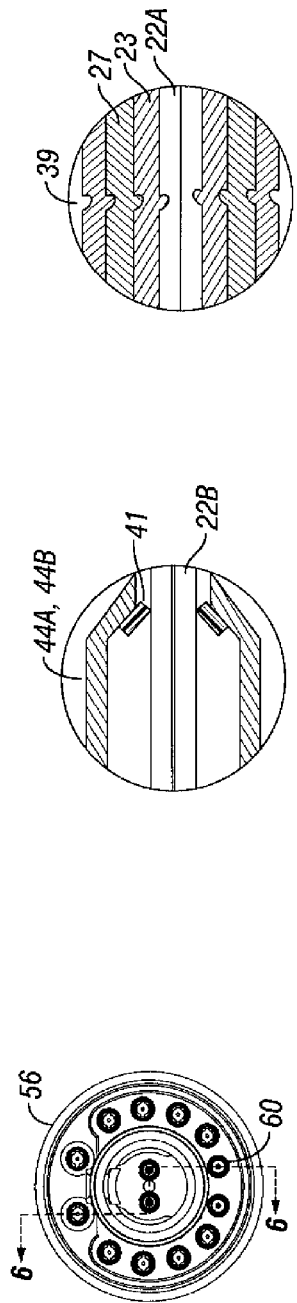
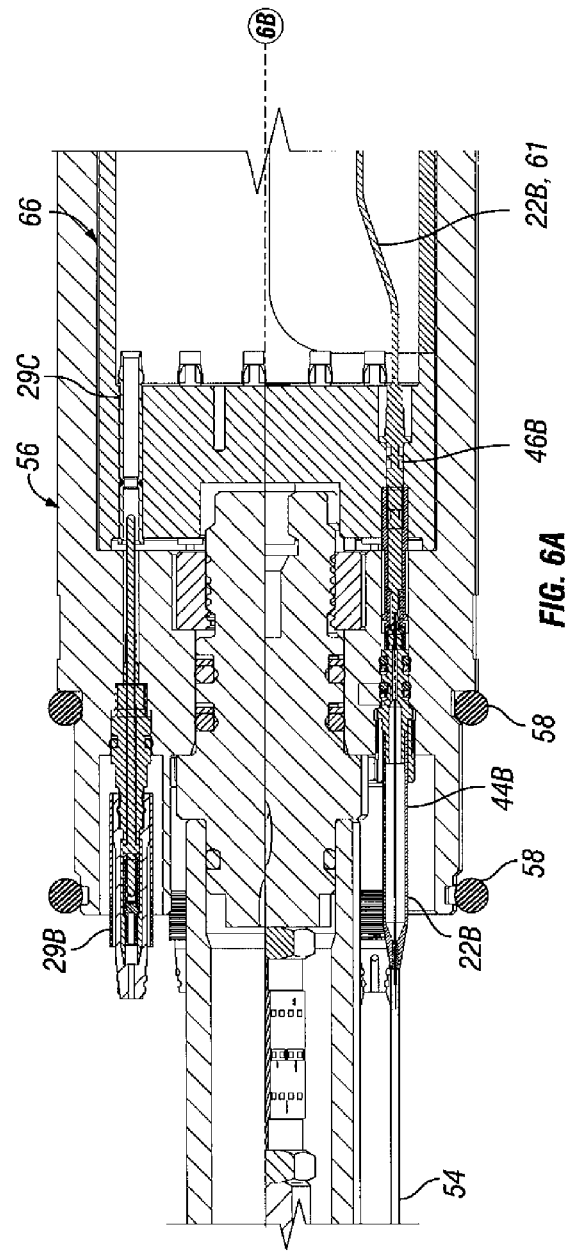

ELECTRO-OPTIC CABLEHEAD AND METHODS FOR OILWELL APPLICATIONS

FIELD OF THE INVENTION

The present invention relates generally to an electro-optic wireline cablehead for transmitting data and power between a wireline cable and a wireline logging tool in a well, and more particularly to such a cablehead that includes at least one single mode or multimode optical fiber for transmitting data and/or optical power between the downhole logging tool and a surface data acquisition system through the wireline cable.

BACKGROUND

Wireline logging operations are performed in a well to measure one or more physical properties of the formation with respect to depth and/or time in or around a wellbore. Such operations are typically performed by connecting a string of logging tools to a wireline cable and lowering the logging tools into a well adjacent to an area of interest within the well. Once within the area of interest, the logging tools are used to make measurements of the physical properties of the formation of interest, as well as wellbore parameters, and to transmit data indicative of the measured properties to the surface of the well through the wireline cable.

Such data transmission is commonly performed by sending electrical signals through electrical lines from the logging tool to the wireline cable, and up the wireline cable to the data acquisition equipment at the well surface. Power transmission to the logging tool is similarly commonly performed by use of electrical lines connecting the logging tool and the wireline cable. However, during such operations, depending on the downhole environment, such electrical data and power transmission can encounter several problems. For example, electrical data transmission lines often experience electromagnetic interference from nearby high voltage conductors, motors, cables, or other electromagnetic devices; electrical data transmission occurs at a relatively slow speed; electrical lines are relatively expensive to maintain; and electronic signals often need to be amplified and/or strengthened in order to be transmitted effectively.

Also, some downhole logging tools gather enormous volumes of data which need to be transmitted uphole at faster rates for real time high speed data and image processing than can be accomplished by transmission across electrical lines. In such situations, the logging tool's logging speed has to be reduced in order to compensate for the relatively slow data transmission across the electrical lines and to prevent data overload. This results in undesirable delay in the overall job completion.

Accordingly, a need exists for a method and a device for improving the speed of data transmission in a wireline logging operation.

SUMMARY

In one embodiment, the present invention is an oil and gas well assembly that includes a wireline cable having at least one optical fiber; a downhole tool having at least one optical fiber; and a cablehead having a first end connected to the wireline cable, a second end connected to the downhole tool. The cablehead further includes at least one optical fiber which transmits data between the at least one downhole tool optical fiber and the at least one wireline cable optical fiber.

In another embodiment, the above assembly further includes first and second bulkheads connected to a cablehead housing such that a pressure sealed area is formed between the first and second bulkheads, and a lower bulkhead assembly connected to the housing which seals off pressure therepast. In such an embodiment, the at least one wireline cable optical fiber is connected to the at least one cablehead optical fiber within the pressure sealed area, and the at least one cablehead optical fiber is connected to the at least one downhole tool optical fiber past the lower bulkhead assembly.

In yet another embodiment, the present invention is a method of transmitting data in an oil and gas well assembly that includes providing a wireline cable with at least one optical fiber; providing a downhole tool with at least one optical fiber; and providing a cablehead with a housing, first and second upper bulkheads, a lower bulkhead, and at least one optical fiber. The method also includes forming a first pressure sealed area between the first and second upper bulkheads, forming a second pressure sealed area past the lower bulkhead; connecting the at least one wireline cable optical fiber to the at least one cablehead optical fiber in the first pressure sealed area; connecting the at least one cablehead optical fiber to the at least one downhole tool optical fiber in the second pressure sealed area; and transmitting data between the at least one downhole tool optical fiber and the at least one wireline cable optical fiber through the at least one cablehead optical fiber.

BRIEF DESCRIPTION OF THE DRAWINGS

These and other features and advantages of the present invention will be better understood by reference to the following detailed description when considered in conjunction with the accompanying drawings wherein:

FIG. 4C is a schematic view of a crimp seal assembly forming a portion of the pressure seal assembly of FIG. 4A;

FIG. 4D is a schematic view of an optical feedthru forming a portion of the pressure seal assembly of FIG. 4A;

FIG. 5 is a front view of a multi-channel bulkhead assembly on the lower side of the cablehead of FIGS. 1 and 2;

DETAILED DESCRIPTION OF EMBODIMENTS OF THE INVENTION

Figure 1:
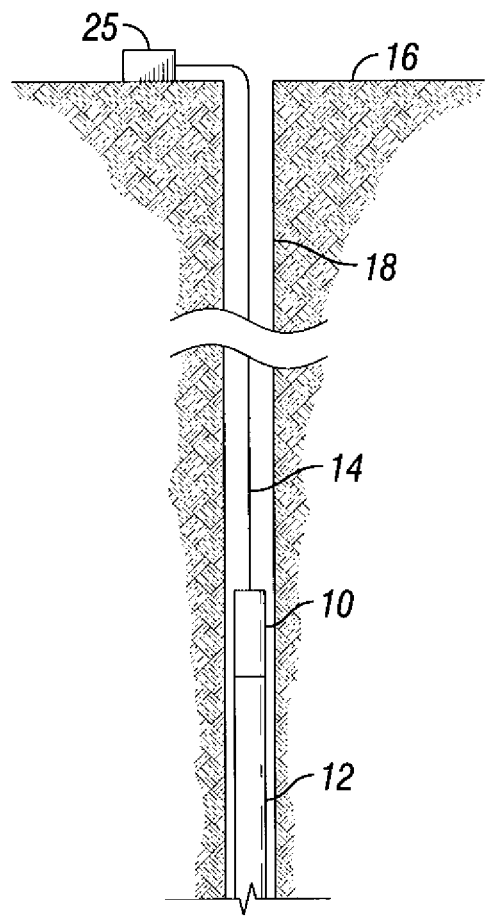
FIG. 1 is a schematic view of a well having an electro-optic cablehead according to one embodiment of the present invention.

As shown in FIGS. 1-8, embodiments of the present invention are directed to a cablehead for electrical and/or optical data transmission, and for conveying electrical and/or optical power to an oilwell tool, such as a logging tool, through a wireline cable in a well. A cablehead is a device that connects a logging tool to a wireline cable in a manner that shields data transmission lines and electrical power lines contained therein from conductive fluids, such as certain drilling muds, and/or other electro-magnetic interference or induced currents in or around the well. [Note: The design techniques as described herein can be used not only for wireline applications but also for coil tubing conveyed wireline applications or drill pipe conveyed logging applications, as well as other devices designed to communicate with fiber optics based equipment in high pressure and high temperature environments.]

As described above, the power and data transmission lines between the logging tool and the wireline cable (and hence the transmission and data lines within the cablehead which connect the logging tool lines to the wireline cable lines) have traditionally been electrical lines. In one embodiment according to the present invention, these power and data transmission lines include at least one optical fiber.

Such optical fiber based high speed power and data transmission lines do not experience some or all of the problems experienced by electrical lines. For example, with respect to electrical lines, optical fiber channels operate at much higher speeds; have a larger data carrying capacity; can transmit data over longer distances without needing to be amplified, "refreshed" or strengthened; are not susceptible to electromagnetic interference; and cost much less to maintain.

However, in order to maintain flexibility of operation, in one embodiment according to the present invention, the cablehead includes at least one electrical transmission line and at least one optical fiber transmission line, such that power and/or data may be transmitted between the logging tool and the wireline cable through the at least one electrical line and/or through the at least one optical fiber. However, in one embodiment whether data is transmitted through the at least one electrical line, through the at least one optical fiber, or through both the at least one electrical line and the at least one optical fiber, the cablehead includes at least one additional electrical line for transmitting power from the wireline cable to the logging tool.

For example, in one embodiment, a cablehead according to the present invention is used with an optical telemetry based logging tool. In such an embodiment, large wattage power can be transmitted through the at least one electrical line to operate the logging tool, and small wattage optical power can be transmitted through the at least one optical fiber to power and/or activate various optical components of the logging tool. As such, in embodiments such as this, the cablehead includes both electrical and optical power and data transmission lines, such that the cablehead can be used with any one of a variety of electrical wireline downhole logging tools both for conveying power to those tools and also for communicating and transmitting data to and from downhole tools to a surface data acquisition system.

FIG. 1 shows a cablehead 10 according to one embodiment of the present invention. (Note that for ease of discussion and following oil field design practice, the left hand side of FIGS. 1-8 may be described as an upper end (or up hole side), and the right hand side of some of FIGS. 4-8 may be described as a lower end (or down hole side).

As shown in FIG. 1, the cablehead 10 is connected at its lower end to a logging tool 12. An upper end of the cablehead 10 is connected to a wireline cable 14. The wireline cable 14 extends all the way to the surface 16 of a well 18 and is operable to lower the cablehead 10 and the logging tool 12 down the well 18 to an area where formation and well parameters need to be determined and recorded during such logging operations. Although a vertical well 18 is shown in FIG. 1, the present invention is also operable in highly deviated and horizontal wells.

In one embodiment, during a logging operation, data is transmitted from the logging tool 12 to the wireline cable 14 through the cablehead 10. Within the wireline cable 14, the data is transmitted to a data transmission and acquisition system 25 at the well surface 16. In most applications, the cablehead 10 is exposed to high temperature and high pressure downhole environments. As such, in one embodiment, the at least one optical fiber is designed to be protected along the entire length of the cablehead 10 from high temperature and high pressure downhole oilwell conditions.

Figure 3:
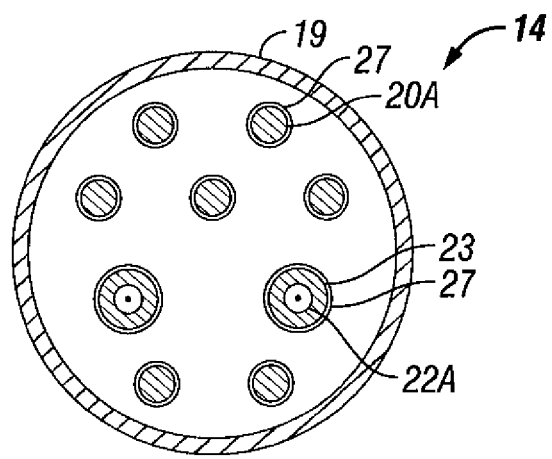
FIG. 3 is a schematic cross-sectional view of a wireline cable for use with the cablehead of FIGS. 1 and 2.

The wireline cable 14 may be connected to the cablehead 10 by any appropriate known means. For example, in the embodiment of FIG. 2, the cablehead 10 includes a rope socket 17 which securely releasably attaches the wireline cable 14 to the cablehead 10 by known means. As shown in FIG. 3, the wireline cable 14 includes a cable armor jacket 19 encasing a plurality of power and data transmission lines (note that this drawing is not to scale.) In the depicted embodiment, these transmission lines include seven electrical lines 20A and two optical fibers 22A. However, in alternative embodiments, the armor jacket 19 may encase any desired number of electrical lines 20A and any desired number of optical fibers 22A, arranged in any desired configuration. The electrical lines 20A may each include one or more copper wires and/or any other suitable electrical conductor.

As shown in FIG. 3, each optical fiber 22A is encased in an electrical conductor cover 23, such as copper, and a thick layer of insulation 27. Each electrical conductor cover 23 and insulation layer 27 protects its enclosed optical fiber 22A from the high pressure and other damaging downhole conditions which may be detrimental to the integrity of the optical fiber 22A. In addition, each of the electrical transmission lines 20A may be encased by a thick layer of insulation 27 to protect transmissions therein.

Referring back to FIG. 2, the rope socket 17 is adjacent to a series of boots 24. In this embodiment there is a boot 24 for each electrical transmission line 20A within the wireline cable 14. Adjacent to the upper side of the boots 24, each electrical transmission line 20A is separated from the wireline cable jacket 19 and inserted into a corresponding one of the boots 24. In one embodiment each boot 24 is composed of a rubber material. The electrical transmission lines 20A, covered only by their corresponding insulation layers 27, then extend from the boots 24 to a lower bulkhead assembly 56 as described further below.

Figure 2A:
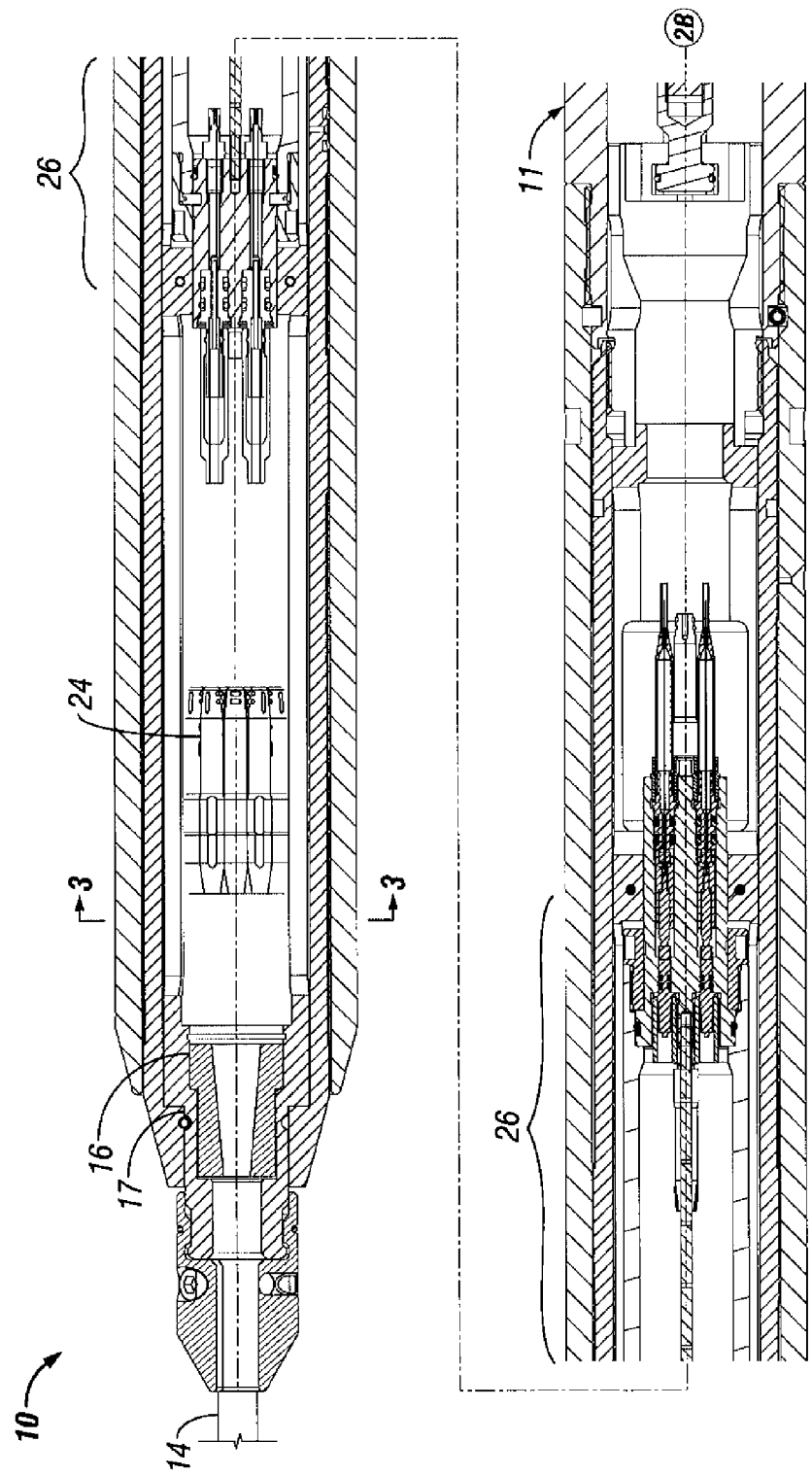
FIG. 2 is an enlarged cross-sectional view of the cablehead of FIG. 1.
Figure 4A:
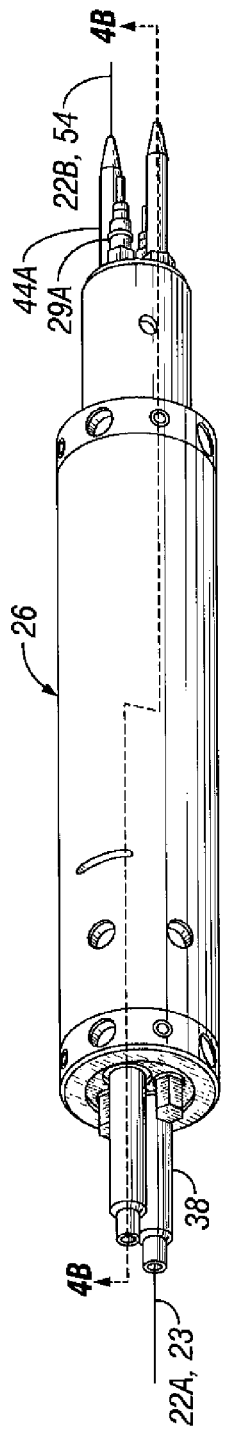
FIG. 4A is a perspective view of a pressure seal assembly of the cablehead of FIGS. 1 and 2.
Figure 4B:
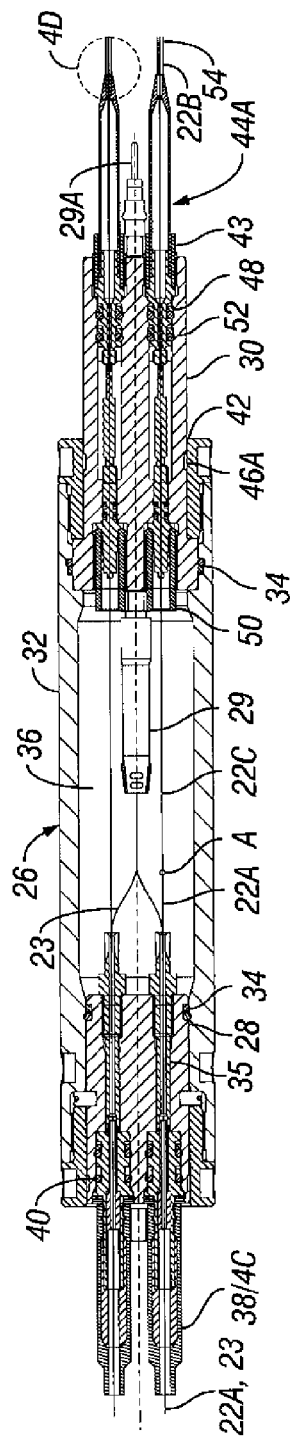
FIG. 4B is a cross-sectional view of the pressure seal assembly of FIG. 4A taken from line 4B-4B.

The optical fibers 22A and their conductor and insulator covers 23,27, on the other hand, do not enter the boots 24 and instead extend into a pressure seal assembly 26 as shown in FIGS. 2 and 4A-4B. The pressure seal assembly 26 includes a first bulkhead 28 and a second bulkhead 30 each connected to a housing 32, such as by a threaded connection. The first and second bulkheads 28, 30 each include at least one outer seal, such as o-ring and backup seals 34, which seal against an interior of the housing 32 to from a pressure sealed or "break out" chamber 36 between the first and second bulkheads 28, 30 into which pressure, such as fluid pressure, is prevented from entering.

At the first bulkhead 28, each optical fiber 22A extends into and through a corresponding longitudinal channel 35 in the first bulkhead 28. At an upper end of the first bulkhead 28, a crimp seal assembly 38 (as shown in FIG. 4C) extends into a portion of each longitudinal channel 35 and includes a central channel through which a corresponding one of the electrical conductor and insulator covered 23,27 optical fibers 22A extends. Each crimp seal assembly 38 is a substantially cylindrical metallic tube, such as an Inconel tube, which houses an optical fiber 22A as well as its corresponding conductor and insulator coverings 23,27.

Each crimp seal assembly 38 has an outer seal 40, such as an o-ring seal and a back up ring, which seals against an inner surface of a corresponding one of the longitudinal channels 35 in the first bulkhead 28 to prevent pressure from entering the pressure sealed chamber 36 from above the chamber 36. The crimp seal assembly 38 is also crimped or compressed in at least one portion of the outer surface thereof, creating a crimped area 39, having a smaller diameter or cross-sectional area than adjacent portions of the outer surface of the crimp seal assembly 38. This crimped area 39 crimps, swages or deforms the outer metal tube and thereby seals and compresses the insulation 27 underneath which in turn protects the conductor cover 23 and corresponding optical fiber 22A so that the optical fiber 22A is protected and sealed from outer high pressure fluid. Note that although only one crimped area 39 is shown, each crimp seal assembly 38 may include any desired number of crimped areas 39.

As described above, the conductor and insulator covers 23,27 protect their corresponding encased optical fiber 22A from the high pressure and other damaging downhole conditions. In one embodiment, the electrical conductor cover 23 and the insulation layer 27 protect their encased optical fiber 22A from an uppermost position in the cablehead 10 to a position within the pressure sealed chamber 36, adjacent to a lower end of the first bulkhead 28. At this position, the pressure sealed chamber 36 protects the optical fiber 22A from the high pressure downhole environment, and therefore the optical fiber 22A no longer needs pressure protection from its corresponding electrical conductor and insulator covers 23,27.

As such, within the pressure sealed chamber 36 each conductor and insulator cover 23,27 is unwrapped from its corresponding optical fiber 22A to allow for attachment of each optical fiber 22A to another optical fiber 22C (as shown at attachment point A in FIG. 4B and described below.) Each unwrapped conductor cover 23 is then connected, such as by soldering or crimping with a corresponding electrical conductor feedthru 29A. The conductor cover 23 then extends from the electrical feedthru 29A to the lower bulkhead assembly 56 as described above with respect to the electrical transmission lines 20A and as described further below. Note that in general, as used herein the term feedthru denotes a structure which experiences pressure on a first side thereof and blocks pressure from entering a second side thereof, which is opposite from the first side, while simultaneously protecting an encased transmission line.

Similar to the first bulkhead 28, the second bulkhead 30 includes a pair of longitudinally extending channels 42. Within a lower end of each longitudinal channel 42 is an optical feedthru 44A. Each optical feedthru 44A is a substantially cylindrical metallic body, such as an Inconel tube, which houses an optical fiber 22B. Each optical feedthru 44A is removably attached to its corresponding longitudinal channel 42 by means of a threaded nut 43. The optical feedthru 44A also includes one or more outer seals 48, such as an o-ring seal and a back up ring, which seals against an internal wall of a corresponding one of the longitudinal channels 42 to prevent fluid pressure from entering the pressure sealed chamber 36 from below the chamber 36. The metallic body of the optical feedthru 44A along with a small diameter flexible metal tubing 54 (discussed below) protect their encased optical fiber 22B from the high pressure downhole environment of the well 18.

Within an upper end of each longitudinal channel 42 and adjacent to each optical feedthru 44A is an optical connector 46A. Each optical connector 46A is a substantially cylindrical body, which houses an optical fiber 22C. Each optical connector 46A is removably attached to its corresponding longitudinal channel 42 by means of a threaded nut 50. Between the optical feedthru 44A and the optical connector 46A is an alignment sleeve 52. The alignment sleeve 52 receives corresponding ends of the optical feedthru 44A and the optical connector 46A in a manner that ensures an alignment between the optical feedthru fiber 22B and the optical connector fiber 22C, allowing for a continuous data transmission connection therebetween. Note that each optical feedthru 44A is exposed at one end to the high pressure downhole environment of the well 18, while each optical connector 46A is disposed within the pressure sealed chamber 36 and therefore is protected from high pressure fluid exposure.

Opposite from the end of the optical connector fiber 22C that is connected to the optical feedthru fiber 22B, the optical connector fiber 22C extends further into the pressure sealed chamber 36. Within the pressure sealed chamber 36, both the wireline cable optical fibers 22A and the optical connector optical fibers 22C are sealed from pressure. Also, at a position within the pressure sealed chamber 36, for example at a position A, each wireline cable optical fiber 22A is attached to a corresponding one of the optical connector optical fibers 22C to form a continuous power and/or data transmission connection therebetween. These connections may be made by fusion splicing, by application of a high temperature epoxy, or by another appropriate method for connecting optical fibers. As such, a continuous power and/or data transmission line is formed across the pressure seal assembly 26 by optical fibers 22A,22C,22B.

Attached, such as by welding, to a lower end of the optical feedthru 44A is a protective tubing 54 that protects the optical fiber 22B from the high pressure downhole environment. In one embodiment, the protective tubing 54 is a small diameter flexible tube made of a corrosion resistance metallic material designed to withstand high pressure and temperature. The protective tubing 54, with the optical fiber 22B encased therein, extends from a lower end of the optical feedthru 44A to a lower bulkhead assembly 56 (see FIGS. 2 and 5-6.)

Figure 6B:
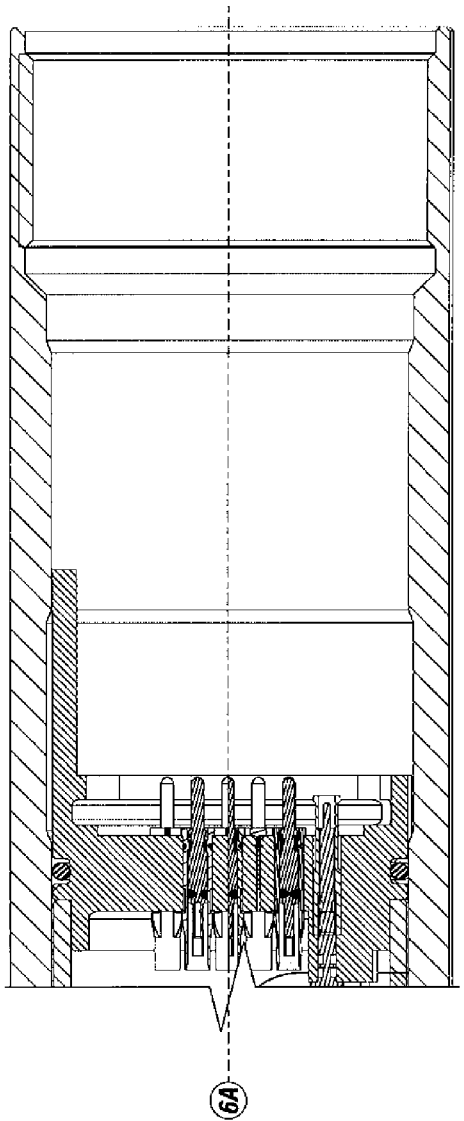
FIG. 6 is a cross-sectional view of the bulkhead assembly of FIG. 5 along with an internal multi-channel electro-optic connector block.
Figure 7:
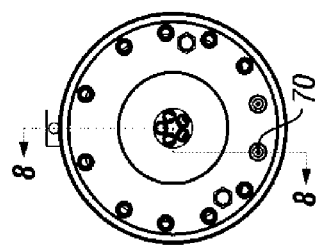
FIG. 7 is a front view of the multi-channel electro-optic connector block assembly of FIG. 6.
Figure 8:
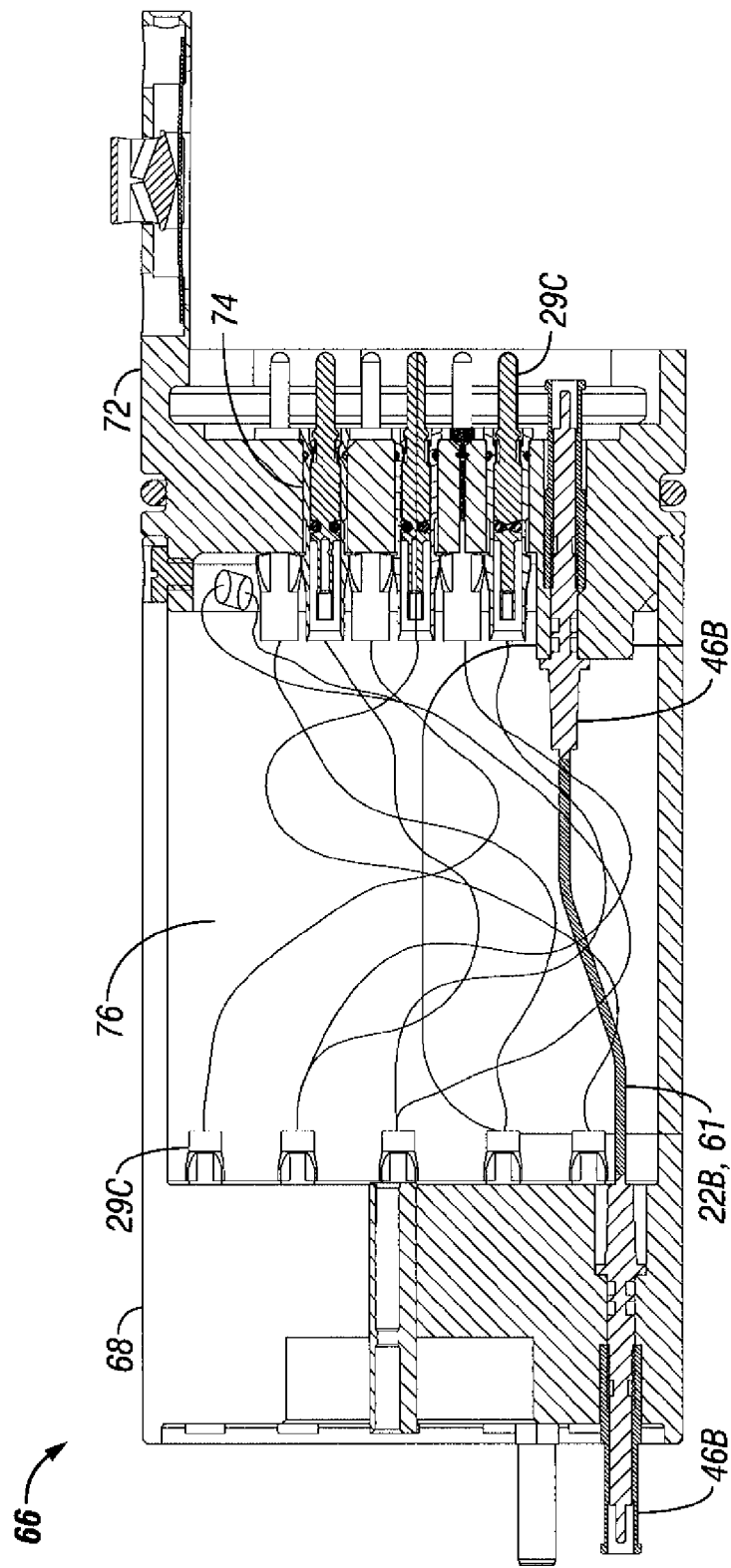
FIG. 8 is a cross-sectional view of the multi-channel electro-optic connector block of FIG. 7.

The bulkhead assembly 56 forms a portion of a housing to the cablehead 10, and is attached, such as by a threaded connection, to an upper portion 11 of the cablehead housing. As shown in FIGS. 2 and 6, the lower bulkhead assembly 56 includes one or more outer seals 58, such as an o-ring seal and a back up ring, which seal against an internal wall of the upper portion 11 of the cablehead housing to prevent pressure from entering below the lower bulkhead assembly 56. The lower bulkhead assembly 56 protects the components below and inside the assembly 56 from the high pressure downhole environment.

As shown by viewing FIGS. 5 and 6 together, the lower bulkhead assembly 56 is a substantially cylindrical body having a plurality of longitudinal channels 60 disposed thereacross. As described above, the protective tubings 54, each with a corresponding optical fiber 22B encased therein, extend from a lower end of the optical feedthru 44A in the pressure seal assembly 26 to an upper end of the lower bulkhead assembly 56. At the upper end of the lower bulkhead assembly 56, each protective tubing 54, with its corresponding optical fiber 22B encased therein, is attached, such as by welding, to an optical feedthru 44B extending from one of the longitudinal channels 60 of the lower bulkhead assembly 56.

Each optical feedthru 44B in the lower bulkhead assembly 56 is substantially similar to the optical feedthru 44B that is attached to the pressure seal assembly (described above with respect to FIG. 4.) and similarly encases and protects a corresponding one of the optical fibers 22B therein. As such, each side of the protective tubings 54 that extend from the pressure seal assembly 26 to the lower bulkhead assembly 56 is attached to an optical feedthru 44A,44B. Consequently, any minor leakages in the protective tubings 54, due for example to manufacturing and/or material defects, can result in fluid entering the optical feedthru 44A,44B and damaging the optical fibers 22B encased therein. Therefore, in one embodiment as shown in FIG. 4D each optical feedthru 44A,44B includes a sealed area 41 (see FIG. 4D) between its metal body and its encased optical fiber 22B to prevent fluid from damaging its encased optical fiber 22B. The sealed area 41 may be made by any appropriate method, for example in one embodiment the sealed area 41 is created by use of a high temperature epoxy, or by frit glass sealing or by a brazed seal, or by any other appropriate glass to metal fusing operation, or any other mechanical method. Within corresponding ones of the longitudinal channels 60 of the lower bulkhead assembly 56 each optical feedthru 44B is connected to an optical connector 46B, by an appropriate means such as that described above with respect to the connection of the optical feedthru 44A and the optical connector 46B within the pressure sealed chamber 36.

As discussed above, the wireline cable electrical transmission lines 20A and their corresponding insulation layers 27 do not need to be protected from the high pressure downhole environment and hence extend all the way from the boots 24 at the upper end of the cablehead 10 to the lower bulkhead assembly 56 at the lower end of the cablehead 10, by-passing the pressure seal assembly 26 in the process.

Additionally, as is also described above, the electrical conductor coverings 23 and their corresponding insulation layers 27 of the wireline cable optical fibers 22A are unwrapped from their corresponding encased optical fibers 22A within the pressure sealed chamber 36. These electrical conductors 23 exit the pressure sealed chamber 36 apart from the optical fibers 22A and extend to the lower bulkhead assembly 56. As such, each electrical conductor covering 23 can act in the same manner as any of the other electrical lines 20A. That is, the electrical conductor coverings 23 can function to transmit power and/or data between the wireline cable 14 and the logging tool 12.

At the lower bulkhead assembly 56, each wireline cable electrical line 20A and each electrical conductor covering 23 is connected to a corresponding electrical feedthru 29B extending from one of the longitudinal channels 60 of the lower bulkhead assembly 56. Each electrical feedthru 29B in the lower bulkhead assembly 56 is substantially similar to the electrical feedthru 29A that is attached to the pressure seal assembly 26. Within corresponding ones of the longitudinal channels 60 of the lower bulkhead assembly 56 each electrical feedthru 29B is connected to an electrical connector 29C by an appropriate means.

In one embodiment, some of the longitudinal channels 60 in the lower bulkhead assembly 56 are designed to accept electrical feedthrus 29B and some of the longitudinal channels 60 in the lower bulkhead assembly 56 are designed to accept optical feedthrus 44B.

Attached to a lower end of the lower bulkhead assembly 56 is a connector block assembly 66. The connector block assembly 66 is a substantially cylindrical part having an upper end 68 with a series of longitudinal channels 70, a lower end 72 also with a series of longitudinal channels 74, and an open area 76 therebetween. Each optical connector 46B and each electrical connector 29C in the lower bulkhead assembly 56 extends into a corresponding one of the channels 70 in the upper end 68 of the connector block assembly 66.

For each optical connector 46B and each electrical connector 29C in the upper end 68 of the connector block assembly 66, there is a corresponding optical connector 46B and electrical connector 29C in the lower end 72 of the connector block assembly 66. The lower end 72 of the connector block assembly 66 is oriented at a particular desired orientation or radial position, as such the electrical lines 20A, 23 and the optical fibers 22B in the connectors 46B,29C in the upper end 68 of the connector block assembly 66 may need to be angularly or radially moved within the open area 76 in order to be attached to the connectors 46B,29C in the lower end 72 of the connector block assembly 66.

In one embodiment, in order to allow for this angular or radial repositioning of the optical fiber 22B, a flexible jumper assembly 61, or a flexible jacketed conduit, encases the optical fiber 22B in the area between the optical connector 46B in the upper end 68 of the connector block assembly 66 and the optical connector 46B in the lower end 72 of the connector block assembly 66.

At an upper end of the logging tool 12, which is threadingly attached to the cablehead 10 at a lower end of the lower bulkhead assembly 56, is a connector 80. The connector 80 includes openings having connectors 65 for receiving outwardly extending pins from each electrical and optical connector 29B,46B in the lower end 72 of the connector block assembly 66. The particular orientation of the lower end 72 of the connector block assembly 66 ensures that the logging tool connector 80 will be aligned with the lower end 72 of the connector block assembly 66. In addition, the mating of the optical connector 46B with the logging tool connector 65 ensures a precise alignment of the optical fibers 22B and 22D disposed in the optical connector 46B and the logging tool connector 65. As such, a continuous communication pathway is established between the optical fibers 22B and 22D.

Each opening in the logging tool connector 80 contains either an electrical line 20B or an optical fiber 22D for forming a communication pathway with a corresponding electrical line 20A, 23 or a corresponding optical fiber 22B in the electrical and optical connector 29B,46B of the lower end 72 of the connector block assembly 66. As such, a continuous data transmission line is formed between the wireline cable 14 and the logging tool 12, through the cablehead 10 by the connection of optical fibers 22A,22C,22B,22D; and a continuous data transmission and/or power lines are formed between the wireline cable 14 and the logging tool 12, through the cablehead 10 by the connection of electrical lines 20A,20B or 23,20B.

As discussed above at every position along the length of the cablehead 10, every optical fiber contained therein is protected from the high pressure downhole environment, which can range up to a pressure of approximately 15,000 psi to 25,000 psi. In addition, in one embodiment each optical fiber that is disposed within the cablehead 10 is selected to be operable up to a temperature of approximately 350° F. to 450° F. Note that although the cablehead is described above as being attached to a logging tool, the cablehead may be attached to any appropriate oilwell tool, or downhole oilwell tool.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. An oil and gas well assembly comprising:
   a wireline cable comprising at least one optical fiber;
   a downhole tool comprising at least one optical fiber; and
   a cablehead comprising a first end connected to the wireline cable, a second end connected to the downhole tool, and at least one optical fiber extending therethrough which transmits data between the at least one downhole tool optical fiber and the at least one wireline cable optical fiber; and
   a lower bulkhead assembly which seals off pressure therepast, and wherein the at least one cablehead optical fiber is precisely aligned with the at least one downhole tool optical fiber past the lower bulkhead assembly to allow communication therebetween.

2. The assembly of claim 1, wherein the at least one cablehead optical fiber also transmits power from the wireline cable to the downhole tool.

3. The assembly of claim 1, further comprising an electrically conductive covering encased around the at least one wireline cable optical fiber, which extends across the cablehead to transmit data and power from the wireline cable to the downhole tool.

4. The assembly of claim 1, wherein the cablehead further comprises at least one electrical transmission line, which transmits data and power from the wireline cable to the downhole tool.

5. The assembly of claim 1, wherein the cablehead further comprises a housing, and first and second bulkheads connected to the housing such that a pressure sealed area is formed between the first and second bulkheads.

6. The assembly of claim 5, wherein the at least one wireline cable optical fiber is connected to the at least one cablehead optical fiber within the pressure sealed area.

7. The assembly of claim 5, wherein the at least one wireline cable optical fiber is encased in an electrically conductive and an insulation covering, and wherein the at least one wireline cable optical fiber is connected to the first bulkhead by a crimp seal assembly which comprises a tube which receives the at least one wireline cable optical fiber and its coverings and comprises a crimped area that crimps or deforms the outer metal tube and thereby seals and compresses the insulation covering around the underlying conductive covering and the at least one wireline cable optical fiber.

8. The assembly of claim 5, wherein the at least one cablehead optical fiber is connected to the second bulkhead by an optical feedthru which comprises a tube which receives the at least one cablehead optical fiber and a sealed area between the tube and the fiber for preventing fluids from entering past the seal.

9. The assembly of claim 1, wherein the precise alignment of the at least one cablehead optical fiber and the at least one downhole tool optical fiber is through matable optical connectors.

10. The assembly of claim 9, wherein the lower bulkhead assembly is connected to a connector assembly having a spaced apart area allowing a radial positioning of the at least one cablehead optical fiber to be changed in moving from the lower bulkhead assembly to the connector assembly prior to alignment with the at least one downhole tool optical fiber.

11. An oil and gas well assembly comprising:
   a wireline cable comprising at least one optical fiber;
   a downhole tool comprising at least one optical fiber; and
   a cablehead comprising:
   a housing comprising a first end connected to the wireline cable, and a second end connected to the downhole tool,
   first and second bulkheads connected to the housing such that a pressure sealed area is formed between the first and second bulkheads,
   at least one optical fiber which transmits data between the at least one downhole tool optical fiber and the at least one wireline cable optical fiber, wherein the at least one wireline cable optical fiber is connected to the at least one cablehead optical fiber within the pressure sealed area, and
   a lower bulkhead assembly connected to the housing which seals off pressure therepast, and wherein the at least one cablehead optical fiber is precisely aligned with the at least one downhole tool optical fiber past the lower bulkhead assembly to allow communication therebetween.

12. The assembly of claim 11, wherein the at least one cablehead optical fiber also transmits power from the wireline cable to the downhole tool.

13. The assembly of claim 11, wherein the cablehead further comprises at least one electrical transmission line, which transmits data and power from the wireline cable to the downhole tool.

14. The assembly of claim 13, further comprising an electrically conductive covering encasing the at least one wireline cable optical fiber, which transmits data and power between the wireline cable to the downhole tool.

15. The assembly of claim 14, wherein the electrically conductive covering is separated from its corresponding wireline cable optical fiber within the pressure sealed area.

16. The assembly of claim 11, wherein the at least one wireline cable optical fiber is encased in an electrically conductive and an insulation covering, and wherein the at least one wireline cable optical fiber is connected to the first bulkhead by a crimp seal assembly which comprises a tube which receives the at least one wireline cable optical fiber and its coverings and comprises a crimped area that crimps or deforms the outer metal tube and thereby seals and compresses the insulation covering around the underlying conductive covering and the at least one wireline cable optical fiber.

17. The assembly of claim 16, wherein the at least one cablehead optical fiber is connected to the second bulkhead by an optical feedthru which comprises a tube which receives the at least one cablehead optical fiber and a sealed area between the tube and the fiber for preventing fluids from entering past the seal.

18. The assembly of claim 11, wherein the lower bulkhead assembly is connected to a connector assembly having a spaced apart area allowing a radial positioning of the at least one cablehead optical fiber to be changed in moving from the lower bulkhead assembly to the connector assembly prior to alignment with the at least one downhole tool optical fiber.

19. The assembly of claim 11, wherein the downhole tool is a logging tool.

20. A method of transmitting data in an oil and gas well assembly comprising:
   providing a wireline cable with at least one optical fiber;
   providing a downhole tool with at least one optical fiber;
   providing a cablehead with a housing, first and second upper bulkheads, a lower bulkhead, and at least one optical fiber;

forming a first pressure sealed area between the first and second upper bulkheads, forming a second pressure sealed area past the lower bulkhead;

connecting the at least one wireline cable optical fiber to the at least one cablehead optical fiber in the first pressure sealed area;

connecting the at least one cablehead optical fiber to the at least one downhole tool optical fiber in the second pressure sealed area; and transmitting data between the at least one downhole tool optical fiber and the at least one wireline cable optical fiber through the at least one cablehead optical fiber.

21. The method of claim 20, further comprising transmitting power from the wireline cable to the downhole tool through the at least one cablehead optical fiber.

22. The method of claim 20, further comprising providing the cablehead with at least one electrical transmission line, and transmitting data and power from the wireline cable to the downhole tool through the at least one electrical transmission line.

23. The method of claim 20, further comprising encasing the at least one wireline cable optical fiber in an electrically conductive covering, and transmitting data and power from the wireline cable to the downhole tool through the electrically conductive covering.

24. The method of claim 20, further comprising encasing the at least one wireline cable optical fiber in an electrically conductive covering, and insulation covering, and a crimp seal tubing, and crimping the crimp seal tubing to seal the insulation covering around the conductive covering and the underlying at least one wireline cable optical fiber.

25. The method of claim 20, further comprising:

connecting the at least one cablehead optical fiber to the second bulkhead by use of an optical feedthru which comprises a tube which receives the at least one cablehead optical fiber and a sealed area between the tube and the fiber for preventing fluids from entering past the seal;

connecting the lower bulkhead assembly to a connector assembly having a spaced apart area allowing a radial positioning of the at least one cablehead optical fiber to be changed in moving from the lower bulkhead assembly to the connector assembly prior to connection to the at least one downhole tool optical fiber; and separating the electrically conductive covering from the at least one wireline cable optical fiber within the first pressure sealed area.

* * * * *